United States Patent [19]

Tucker

[11] 4,378,482

[45] Mar. 29, 1983

[54] ELECTRON-BEAM STAGE X-Y POSITIONING INSTRUMENTATION

[75] Inventor: Theodore W. Tucker, Lincoln, Mass.

[73] Assignee: Control Data Corporation, Minneapolis, Minn.

[21] Appl. No.: 257,824

[22] Filed: Apr. 27, 1981

[51] Int. Cl.³ .................. B23K 31/10; B23K 37/04
[52] U.S. Cl. .................. 219/121 EY; 219/121 EU;
  219/121 LY; 324/260; 414/750; 318/592
[58] Field of Search .............. 219/121 EX, 121 EY,
  219/121 EU, 121 PV, 121 LU, 121 LX, 121
  LY, 123; 340/686; 324/219, 220, 260; 414/750;
  318/592; 310/15, 25, 49 R

[56] References Cited

U.S. PATENT DOCUMENTS

| | | | |
|---|---|---|---|
| 3,267,250 | 8/1966 | Ullery | 219/121 EY |
| 3,814,895 | 6/1974 | Fredriksen | 219/121 LY |
| 4,029,406 | 6/1977 | Sickles | 414/750 |

*Primary Examiner*—B. A. Reynolds
*Assistant Examiner*—Teresa Walberg
*Attorney, Agent, or Firm*—Edward P. Heller, III; Joseph A. Genovese

[57] ABSTRACT

Electron-beam stage X-Y positioning instrumentation is provided. The electron-beam stage has a number of metal blocks affixed to its bottom. Fixed orthogonal noncontact gage heads are used to sense the distance of the heads from the parallel faces of a proximate metal block. The position of the metal block vis-a-vis the position of the fixed referenced gage heads yields the X-Y coordinates of the stage. The stage is first coarsely positioned adjacent a preselected block. Thereafter the exact position of the stage is computed from the distances sensed by the gage heads. The electron beam electronics are automatically adjusted to the actual position of the stage thereby eliminating the relatively slow, fine positioning of the stage.

12 Claims, 7 Drawing Figures

ELECTRON-BEAM STAGE X-Y POSITIONING INSTRUMENTATION

BACKGROUND OF THE INVENTION

1. Field of the Invention

The invention relates generally to the field of positioning instrumentation for positioning bodies movable in or horizontal plane and more particularly to electron-beam stage X-Y positioning instrumentation.

2. Brief Description of the Prior Art

Prior electron-beam stage X-Y positioners have generally been of the screw type having a laser interferometer returning position information. There are several problems associated with this type of positioner: first, the manufacture of position screws capable of moving the stage very small fractions of an inch is relatively expensive; second, movement of the stage via such a screw is relatively slow; third, a laser interferometer in the electron beam environment must be placed relatively remote from the stage itself thereby magnifying errors; and fourth, the laser interferometer itself may not possess high compatibility with the high vacuum required in electron-beam etching applications.

The invention described herein contemplates the use of conventional noncontact gage heads to sense the position of the stage by measuring the distance in two dimensions to one of a number of discretely located metal blocks affixed to the bottom of the stage. Noncontact gage heads sense the position of a proximate surface by means of capacitance, magnetism, optics and the like, depending on the type of head employed. Gage heads have heretofore been used in a great variety of applications wherein the distance to a surface is desired to be measured without contact.

SUMMARY OF THE INVENTION

The invention comprises a discrete position-sensing apparatus or instrumentation for sensing the position of a body movable among a number of discrete positions in a coordinate X-Y plane. The elements of the positioning apparatus include a flat surface attached to the body. Upon this surface are mounted a number of orthogonal surface pairs, one pair each for each discrete position to which it is desired to move the body. In a fixed position vis-a-vis the body are mounted a pair of noncontact distance sensing gage heads, orthogonal to each other, for sensing the distance in two dimensions to a given pair of orthogonal surfaces. The fixed position of the gage heads and the distance in two dimensions to a known reference on the body yields the position of the body in the X-Y plane.

The gage heads in one embodiment are immobile. Space between adjacent pairs of orthogonal surfaces is made sufficient to allow relative movement of the heads therebetween. This allows the body to move in the X-Y plane without encountering the gage heads.

In a second embodiment, the gage heads are made retractable out of the X-Y plane. In one form this comprises cantilever flexure supports. A parallelogram mounting arrangement maintains head Z direction orientation when registered in the X-Y plane. A second reversed cantilever of equal length, or if unequal length, of a different material having a correspondingly different co-efficient of expansion, compensates for thermal expansion offsets.

DESCRIPTION OF THE PREFERRED EMBODIMENT

Figure 1:
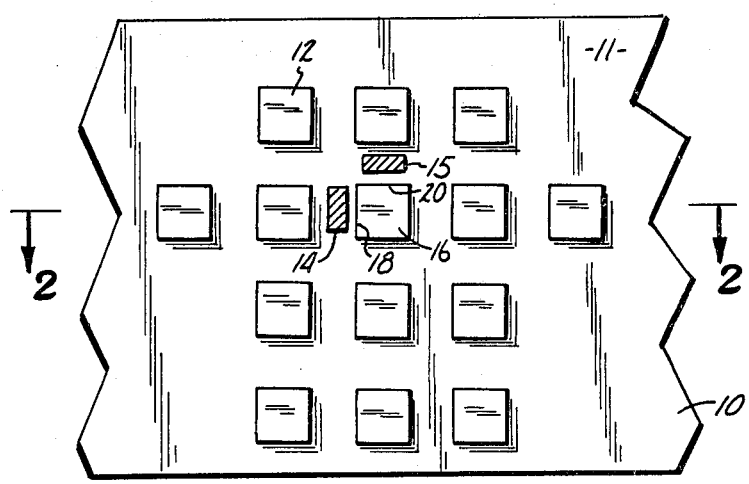
FIG. 1 is a partial bottom plan view of a body moveable in an X-Y plane including the gage heads of the present invention.

Referring to FIG. 1, a partial plan view of the bottom of a body 10 moveable in an X-Y plane, at least one portion of the bottom includes a relatively flat surface upon which are mounted a predetermined number of blocks 16, which, in the preferred embodiment, are metal blocks. It is noted that for the purposes of the invention the metal blocks need not take the shape of a cube but may, rather, need only have two planar surfaces orthogonal to each other. The two necessary surfaces in the Fig. are the surface 18 and the surface 20.

The blocks 16 are mounted in a coordinated fashion, each pair of orthogonal surfaces parallel to each other pair, at a number of preselected discrete positions on the flat surface 11. The positions are chosen to allow the stage to be positioned at a similar number of discrete positions, as will become more readily apparent in the discussion infra.

Shown also in the Figure are noncontacting gage heads 14 and 15. These gage heads are fixedly and orthogonally mounted by means to be discussed infra. Their purpose is to sense by indirect means, such as capacitance, magnetism, optics and the like, the distance between a gage head 14 or 15 and a proximate surface 18 or 20 of one of the metal blocks 16. As the position of the gage heads is fixed and the position of the metal blocks 16 on the body 10 is fixed, the two orthogonal distances measured by the gage heads 14 and 15 yield the position of the body 10 in the X-Y plane.

Figure 2:
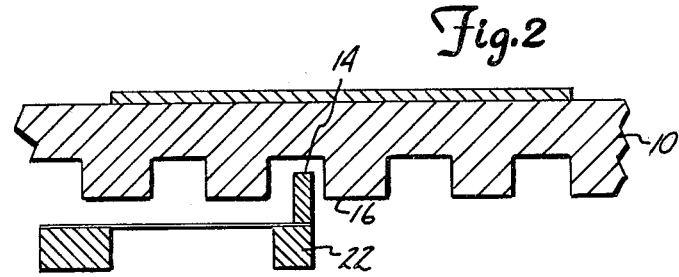
FIG. 2 is a cross sectional view along 2—2 of FIG. 1, and further including a cantilever gage head support.
Figure 3:
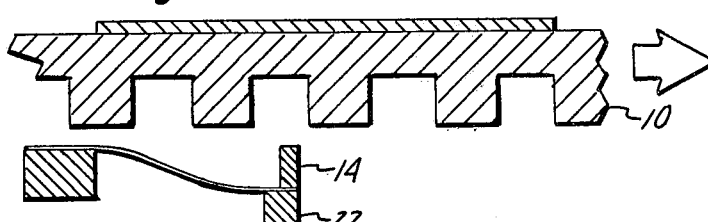
FIG. 3 is the same view as FIG. 2, but showing the gage head withdrawn.

FIGS. 2 and 3 show the essential features of a cantilever flexure support 22 for a gage head 14 or 15. In FIG. 2, the cantilever flexure support 22 is shown aligned with the X-Y plane of the metal blocks 16. In this position the body 10 is not free to move laterally in the X-Y plane relative to the gage head 14 without collision with a gage head 14 or 15.

In FIG. 3 the cantilever flexure support 22 is withdrawn downwards out of the X-Y plane of the blocks to thereby allow lateral movement of the body 10 relative to the gage head 14.

Figure 4:
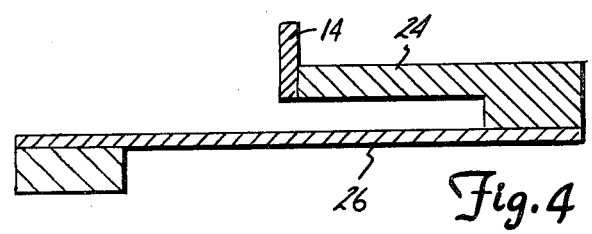
FIG. 4 is a side plan view of a gage head support having two cantilever members of differing coefficients of thermal expansion.
Figure 5:
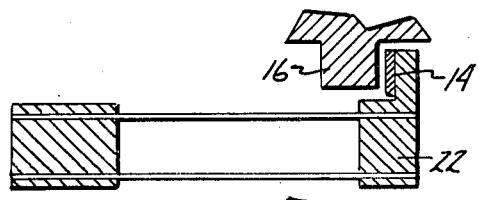
FIG. 5 is a side plan view of parallelogram flexure gage head support.
Figure 5:
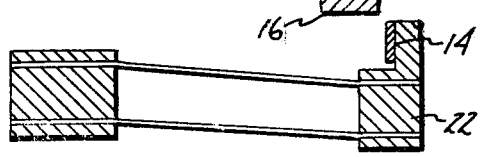

To compensate for thermal offsets in the cantilever flexure support 22, an additional reversed cantilever support 26 (FIG. 4) is necessary. If the cantilever flexure members 24 and 26 are of the same material, they should be of equal length. If this mounting arrangement is impracticable, the arrangement shown in FIG. 4 may be used in which the flexure support members 24 and 26 are made of the dissimilar materials having differing coefficients of thermal expansion such that the corresponding thermal offsets of the two members 24 and 26 approximately cancel each other.

Where the type of gage head employed requires maintenance of vertical Z direction head alignment, the parallelogram flexure support structure shown in FIG. 5 is recommended.

Figure 6:
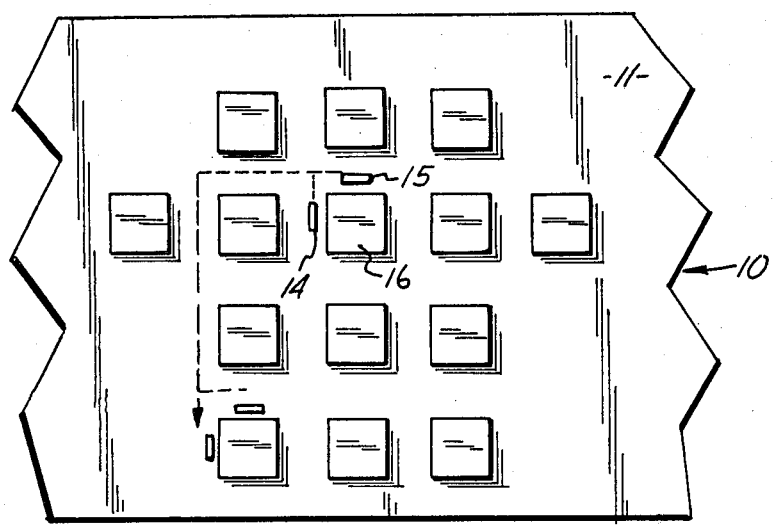
FIG. 6 is a bottom plan view of the stage illustrating an exemplary path of relative movement of unretractable gage heads.

In an embodiment in which the gage heads employed are relatively small, the spacing between blocks 16 appears relatively large. In this case, the cantilever flexure supports can be dispensed with and a fixed support substituted. The positioning of the body 10 vis-a-vis the gage heads can be made by the exemplary circuitous path shown in FIG. 6. This embodiment requires a more complex path of travel thereby increasing time between stable positions. However, the time required for stabilization of the cantilever flexure support system of the previous embodiments is eliminated.

Figure 7:
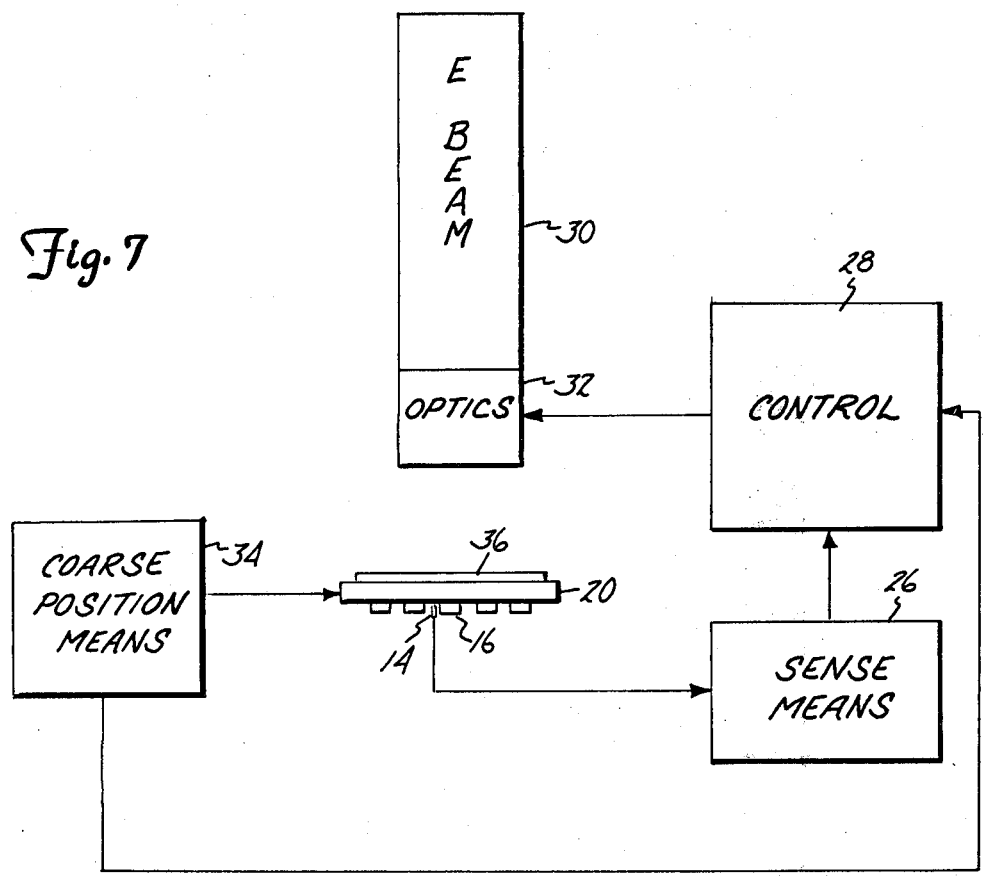
FIG. 7 is a block diagram of the positioning system as used in an electron-beam etching application.

FIG. 7 shows in a block diagram form an electron beam etching system employing the X-Y positioning instrumentation of the present invention. The waffer or mask 36 to be etched is mounted on top of stage 20. Metal blocks 16 are mounted on the bottom of stage 20. The stage itself is mounted on an X-Y moveable platform (not shown) known in the art. Coarse positioning means 34 under control of electronic control 28 rapidly positions stage 20 by conventional means, such as a voice coil actuator, to a predetermined position wherein a given one of the metal blocks 16 are adjacent to the aligned (unflexed) position of the fixed gage heads 14 and 15. Where necessary, the gage heads are moved into X-Y planar alignment with blocks 16 and stabilized. At this point fine positioning is unnecessary as will become clear shortly. (The lack of fine positioning leads to an overall increase system speed and a decrease in system cost.) The gage heads 14 and 15 are connected to sense means 26, which convert the capacitive, magnetic or optical values sensed from gages heads 14 and 15 into a digital (or, possibly, analog) representation of the distance between the gage head 14 or 15 and the proximate surface of block 16. This yields the distance in two dimensions from the fixed reference gage heads 14 and 15 to a fixed reference on the movable stage 20 to thereby yield the position of stage 20 in the X-Y plane.

The sense means 26 transmits the distances measured to electronic control 28, which compares the actual position of stage 20 to its nominal position to compute its frame of reference offset. The electronic control 28 then adjusts control of the optics 32 of the electron-beam 30 gun such that the frame of reference of the focus of the optics 32 in the X-Y plane of the wafer or mask 36 is adjusted from its nominal frame of reference by the amount of the offset to accommodate the actual position of stage 20.

Adjustment of the electron-beam gun optics 32 limits the range of accuracy of the electron beam in the X-Y plane by the amount of the maximum offset of the coordinate stage 20 from its nominal position (plus accumulated intermediate electronic and physical inaccuracies.) However, this loss in range is compensated for by vastly increased speed of positioning.

The enumeration of specific elements of the preferred embodiment is not by means a limitation on the scope of the appended claims, in which I claim:

1. A positioning instrument for a body moveable in an X-Y plane, said body having one section adapted for mounting thereon a workpiece comprising:
   at least one horizontal planar section mounted on said body and spaced from said one section adapted for mounting a workpiece;
   a plurality of pairs of orthogonal faces mounted at predetermined positions on said planar section, the respective faces of each pair in parallel planar alignment with each other;
   a pair of noncontact gage heads fixedly and orthogonally mounted adjacent said planar section;
   sensing means connected to each gage head for sensing the distance from the gage head to a face of a one of said pairs of orthogonal faces in proximity therewith.

2. The positioning instrument of claim 1 further including coarse positioning means for moving the body in the X-Y plane to a preselected position wherein a given one of said pairs of orthogonal faces is proximate said pair of noncontact gage heads.

3. The positioning instrument of claim 1 further including an electron-beam gun having optics and electronic means connected to said optics for offsetting the frame of reference of the focus of said optics in an X-Y plane; said electronic means having further means connected to said sensing means for adjusting the offset of said frame of reference in response to the distances between said gage heads and said faces sensed by said sensing means.

4. The positioning instrument of claim 1 wherein said sensing means includes means for sensing the capacitance between the gage head and the proximate face.

5. The positioning instrument of claim 1 wherein said sensing means includes means for optically measuring the distance between the gage head and the proximate face.

6. The positioning instrument of claim 1 wherein said sensing means includes means for magnetically measuring the distance between the gage head and the proximate face.

7. The positioning instrument of claims 1, 5 or 6 wherein each face is composed of a metal.

8. The positioning instruments of claims 1, 5, or 6 wherein a pair of faces are two of the faces of a metal block.

9. The positioning instruments of claims 1, 2, or 3 wherein each gage head further includes means for withdrawing the gage head from alignment with the X-Y plane of said plurality of faces to allow unimpeded X-Y motion of said body.

10. The positioning instrument of claim 9 further including cantilever flexure support mounting means for mounting said gage heads.

11. The positioning instrument of claim 10 wherein said cantilever flexure support mounting means includes parallelogram flexure support mounting means.

12. The positioning instrument of claim 10 wherein said cantilever flexure support mounting means includes first and second cantilever means, the second mounted in a reversed direction from the first, for compensating for thermal expansion of said cantilever flexure support mounting means.

\* \* \* \* \*